United States Patent
Fujii et al.

(10) Patent No.: US 6,855,177 B2
(45) Date of Patent: Feb. 15, 2005

(54) METHOD FOR PRODUCING SOLID ELECTROLYTIC CAPACITOR

(75) Inventors: Tatsuo Fujii, Osaka (JP); Katsumasa Miki, Hirakata (JP); Makoto Nakano, Neyagawa (JP); Suzushi Kimura, Toyonaka (JP); Yuji Mido, Higashiosaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 97 days.

(21) Appl. No.: 10/362,227

(22) PCT Filed: Jun. 24, 2002

(86) PCT No.: PCT/JP02/06304
§ 371 (c)(1),
(2), (4) Date: Feb. 21, 2003

(87) PCT Pub. No.: WO03/005387
PCT Pub. Date: Jan. 16, 2003

(65) Prior Publication Data
US 2003/0154583 A1 Aug. 21, 2003

(30) Foreign Application Priority Data
Jun. 25, 2001 (JP) .................................... 2001-190965

(51) Int. Cl.[7] .......................... H01G 9/00; H01G 4/228
(52) U.S. Cl. ...................... 29/25.03; 361/523; 361/540
(58) Field of Search ................. 29/25.03; 361/523–524, 361/540

(56) References Cited

U.S. PATENT DOCUMENTS

| | | | | |
|---|---|---|---|---|
| 3,864,169 A | * | 2/1975 | Cestaro et al. | 156/279 |
| 5,377,073 A | | 12/1994 | Fukaumi et al. | 361/540 |
| 6,466,430 B2 | * | 10/2002 | Mido et al. | 361/529 |
| 6,510,045 B2 | * | 1/2003 | Mido et al. | 361/529 |

FOREIGN PATENT DOCUMENTS

| | | | |
|---|---|---|---|
| JP | 2-137311 | | 5/1990 |
| JP | 409213587 A | * | 8/1997 |
| JP | 11-274002 | | 10/1999 |

* cited by examiner

Primary Examiner—Ha Tran Nguyen
(74) Attorney, Agent, or Firm—Parkhurst & Wendel, L.L.P.

(57) ABSTRACT

A method for manufacturing large capacitance solid electrolytic capacitors that can be connected direct with semiconductor component, and offer a superior high frequency characteristic. An aluminum foil 3 is made porous in one of the surfaces, a dielectric layer 2 is formed on the porous portion, a through hole 4 is provided in the aluminum foil 3 at a certain specific location. An insulation layer 5 is formed to cover the other surface, viz. non-porous surface, of the aluminum foil 3 and the inner wall surface of through hole 4, a solid electrolytic layer 6 is provided on the dielectric layer 2, and a through hole electrode 7 is formed in the through hole 4, and then a collector layer 8 is formed on the solid electrolytic layer 6. The insulation layer 5 disposed on aluminum foil 3 is provided with an opening 9 at a certain specific location, and a connection terminal 10 is provided at the opening 9 of insulation layer 5 and the exposed surface of the through hole electrode 7, respectively.

24 Claims, 9 Drawing Sheets

US 6,855,177 B2

METHOD FOR PRODUCING SOLID ELECTROLYTIC CAPACITOR

TECHNICAL FIELD

The present invention relates to a method for manufacturing solid electrolytic capacitor for use in various kinds of electronic apparatus.

BACKGROUND ART

In line with the recent trends of downsizing and introduction of higher frequencies among the electronic apparatus, capacitors are requested to be compact yet to have a larger capacitance, a lower ESR (Equivalent Series Resistance) and a lower ESL (Equivalent Series Inductance).

As to the technology for increasing capacitance of a solid electrolytic capacitor (hereinafter referred to as SEC), the U.S. Pat. No. 5,377,073 and the Japanese Patent Laid-open No. H11-274002 disclose a technology of laminating capacitor elements in a chip-type capacitor. Thus the conventional SECs can be increased in the capacitance, and improved in the ESR.

However, when mounting the conventional SECs on the surface of a circuit board like semiconductor components, the SECs need the help of external terminals for connection. This way of connection poses a limitation in the improvement of ESL. In order to further reduce the ESL, shapes and length of terminals for electrical connection and the wirings need to be streamlined. The present invention addresses the above problems, and aims to offer a method for manufacturing large capacitance SECs that can be connected direct with semiconductor components and implement a superior high frequency response.

DISCLOSURE OF THE INVENTION

A method for manufacturing SEC in accordance with the present invention comprises the steps of forming a porous portion on one of the surfaces of an aluminum foil, forming a dielectric layer on said porous portion, forming a through hole at a certain specific location of said aluminum foil, forming an insulation layer on said aluminum foil covering the other surface which is opposite to the one having said porous portion and the inner wall surface of said through hole, forming a solid electrolytic layer on said dielectric layer, forming a through hole electrode in said through hole, forming a collector layer on said solid electrolytic layer, forming an opening at a certain specific location of said insulating layer provided on said aluminum foil, and forming a connection terminal in said opening and on the exposed surface of said through hole electrode. Since the connection terminals provided in the opening of insulation layer and on the exposed surface of through hole electrode are disposed on a same plane, the SEC can be connected direct with semiconductor component and offers a superior high frequency characteristic.

BEST MODE FOR CARRYING OUT THE INVENTION

Figure 1:
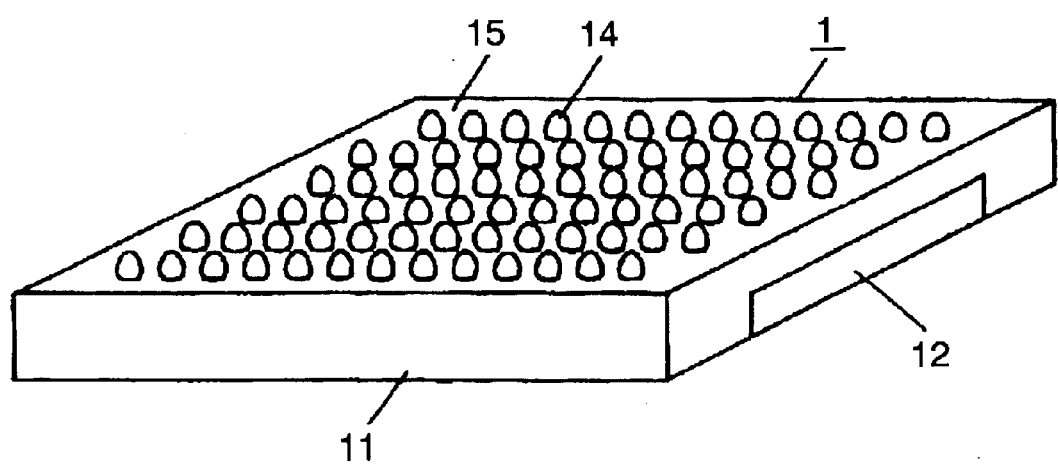
FIG. 1 is a perspective view of an SEC manufactured in accordance with a first exemplary embodiment of the present invention.

A solid electrolytic capacitor (SEC) and the method of manufacture in accordance with exemplary embodiments of the present invention are described referring to the drawings. The drawings are aimed to present the concepts, not to exhibit precise dimensions.

Embodiment 1

Figure 2:
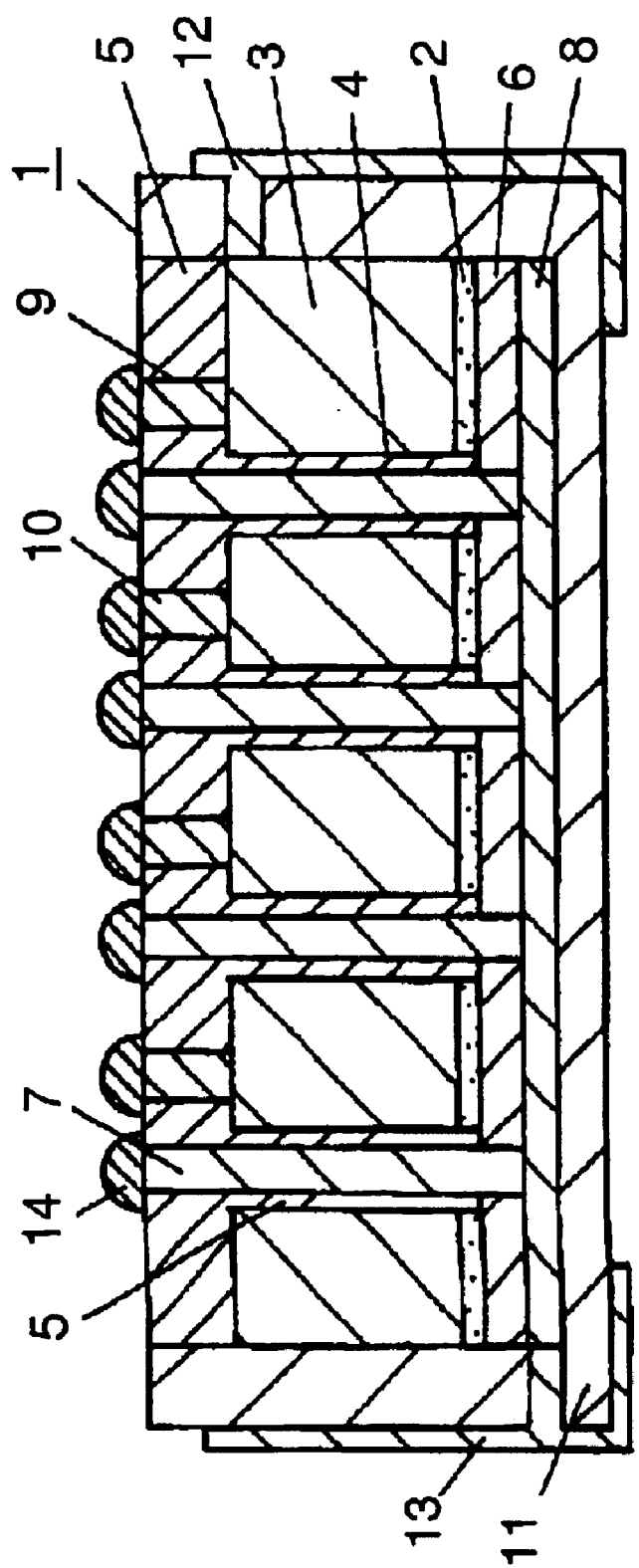
FIG. 2 is a cross sectional view of an SEC in the first embodiment.
Figure 3:
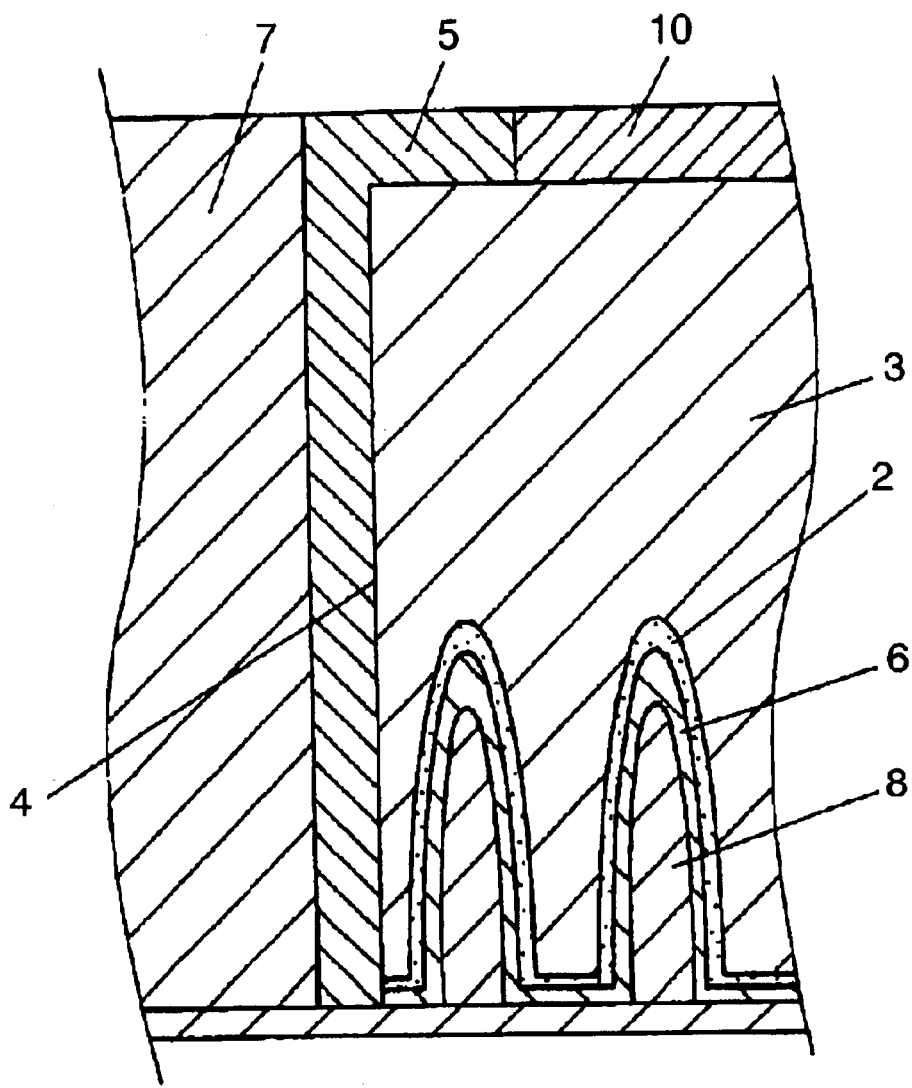
FIG. 3 is a cross sectional magnified view of an SEC, showing the key portion in the first embodiment.

Reference is made to FIG. 1–FIG. 3, in a sheet-formed capacitor element 1, one of the surfaces of an aluminum foil 3 is made porous by etching or the like process, a dielectric layer 2 is formed on the porous portion, and a through hole 4 is formed in the aluminum foil 3 at a certain specific location. An insulation layer 5 is provided to cover the other surface, viz. non-porous surface, of the aluminum foil 3 and the inner wall surface of through hole 4, and a solid electrolytic layer 6 is formed on the dielectric layer 2. A through hole electrode 7 is formed in the through hole 4, and then a collector layer 8 is formed on the solid electrolytic layer 6. Next, the insulation layer 5 on aluminum foil 3 is provided with an opening 9 at a certain specific location, and the surface exposed by the opening 9 is provided with a connection terminal 10. The through hole electrode refers to an electrode formed in the through hole.

The capacitor element 1 thus structured is provided with a package 11 covering the side surfaces and the collector layer 8. A first external terminal 12, which is electrically connected with the aluminum foil 3, and a second external terminal 13, which is electrically connected with the collector layer 8, are provided on the package 11, and then a connection bump 14 is provided on the through hole electrode 7 and the connection terminal 10, respectively. A finished SEC is thus completed. In the following, a method for manufacturing SEC in the present invention is described referring to the drawings FIG. 4 through FIG. 12.

Figure 4:
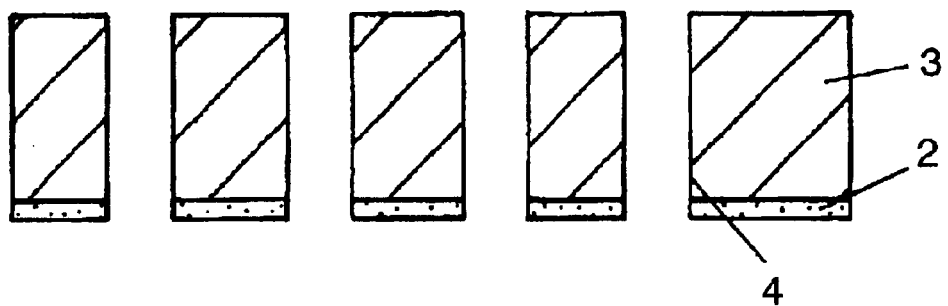
FIG. 4 is a cross sectional view of aluminum foil of an SEC, showing a state after chamfering in the first embodiment.

The aluminum foil 3 with dielectric layer 2 is provided by etching one of the surfaces of an aluminum foil 3 to make it porous, and then forming a dielectric oxide film thereon through anode oxidization in a electrolytic solution. And then, the aluminum foil 3 is provided with a through hole 4 at a certain specific location, as shown in FIG. 4.

Figure 5:
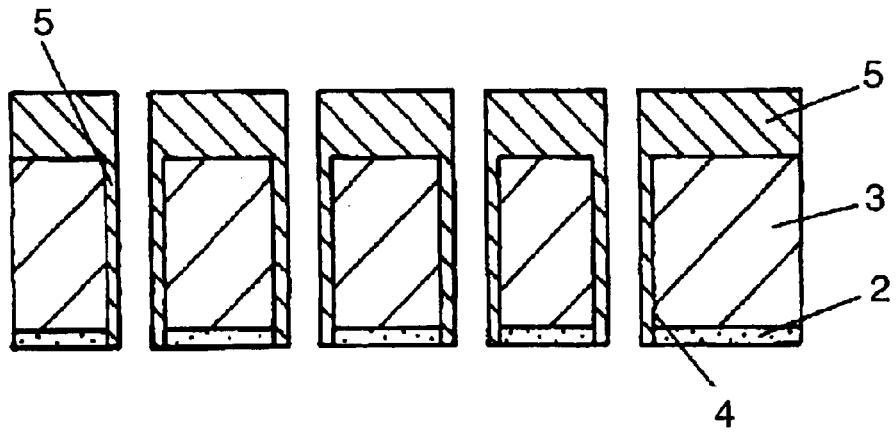
FIG. 5 is a cross sectional view of aluminum foil of an SEC, showing a state after an insulation layer was formed covering the non-porous surface and the inner wall surface of through hole in the first embodiment.

The through holes can be formed altogether by means of a wet etching process. Besides the wet etching, a finer through hole of 100 $\mu$m or smaller can be formed at a high precision level by using a laser beam machining, a punching method, a drilling method, an electric discharge machining, or the like means. The above methods are applicable to any kinds of materials. When forming the through holes by wet etching process, an aluminum foil 3 is etched after the foil is provided at both surfaces with resist film having openings at places corresponding to the through holes, and then the resist film is removed. If edge of the through hole at the surface to be facing to dielectric layer 2 is chamfered by means of wet etching or the like process, it contributes to further improve the reliability of an insulation layer, which will be provided at a later step. Next, by applying an insulating film through electrodeposition, an insulation layer 5 is formed to cover the other surface, viz. non-porous surface, of the aluminum foil 3 and the inner wall surface of through hole 4, as shown in FIG. 5. Although the electrodeposition provides an even and intense insulation layer, there is a possibility that the thickness of the layer turns out to be slightly thinner at the edge of through hole 4 facing the dielectric layer 2. The edge chamfering is effective for eliminating the risk and implementing a higher insulating reliability. Application of an insulating resin containing a micro gel of high edge-covering property, carbon particles and titanium oxide particles through electrodeposition is quite advantageous. The micro gel referred to in the present example is a polymer added with a polymer substance of particle diameter 10 $\mu$m or smaller to increase the viscosity and lower the fluidity; thereby improving the edge-covering property. However, if a resin mixture of high edge-covering property is electrodeposited onto the inner wall surface of fine through hole of 100 $\mu$m or smaller, the deposited layer may become too thick and clog the through hole. Therefore, it is advised to split the electrodepostion into two stages; first attaching a thin film of a high resistively resin and then an insulating resin which is a mixture of a micro gel of high edge-covering property, carbon particles and titanium oxide particles. By so doing, an insulation layer 5 of low failure rate is provided on the inner wall surface of through hole.

Figure 6:
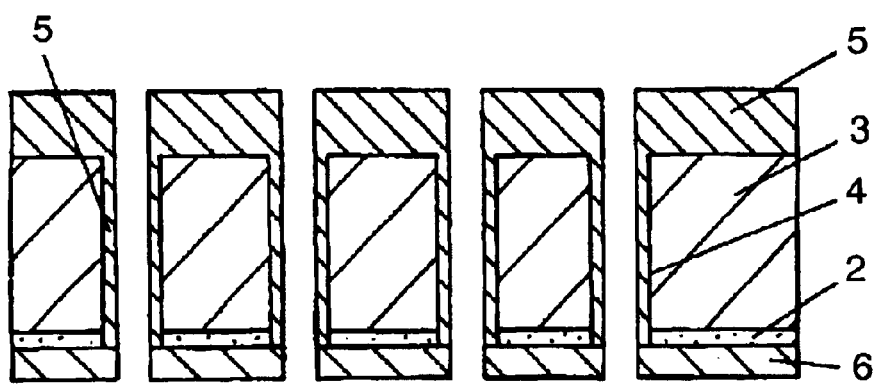
FIG. 6 is a cross sectional view of aluminum foil of an SEC, showing a state after a solid electrolytic layer was formed on dielectric layer in the first embodiment.

Then, as shown in FIG. 6, a solid electrolytic layer 6 is formed on the dielectric layer 2. The solid electrolytic layer 6 can be formed through a chemical polymerization or an electrolytic polymerization of a $\pi$ electron conjugated polymer such as polypyrrole, polythiophene, and/or a composite material containing a conducting polymer other than that; or by combining these. Besides the above-described process, it can be formed by applying a suspension of conducting polymer and drying it, and then conducting an electrolytic polymerization; or, by impregnating it with manganese nitrate and then heat-decomposing it to generate manganese dioxide, and then conducting an electrolytic polymerization. A further established technology available for forming a solid electrolytic layer is forming manganese dioxide by heat-decomposing manganese nitrate. Thus, the productivity and the reliability can be improved by selecting an appropriate process that provides an intense layer at an optional thickness.

Figure 7:
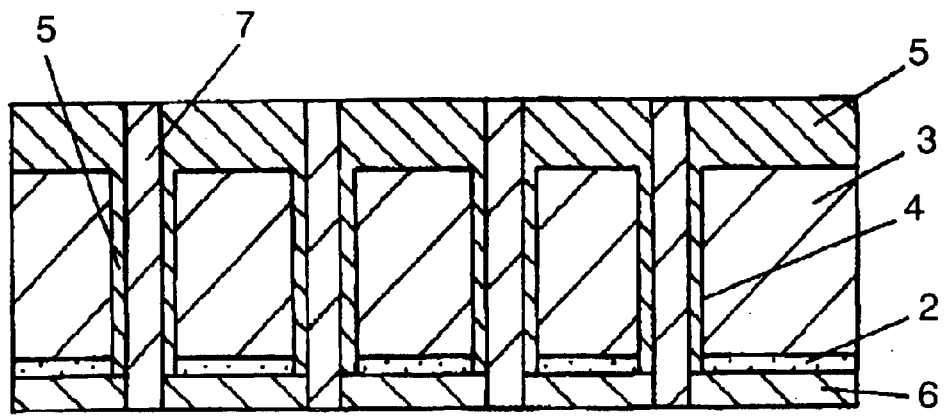
FIG. 7 is a cross sectional view of an SEC, showing a state after a through hole electrode was formed in the through hole in the first embodiment.
Figure 8:
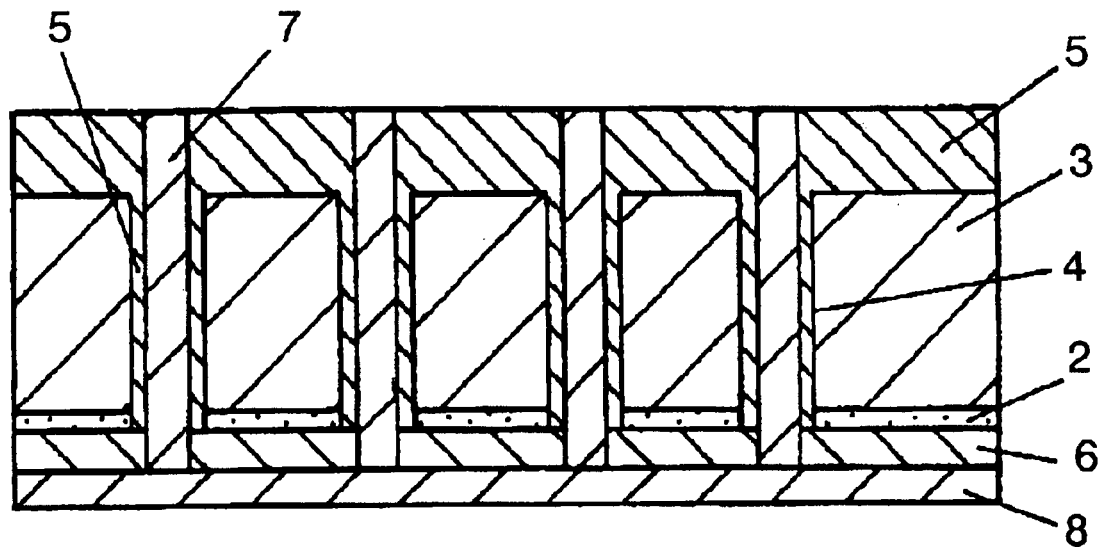
FIG. 8 is a cross sectional view of an SEC, showing a state after a collector layer was formed on solid electrolytic layer in the first embodiment.
Figure 9:
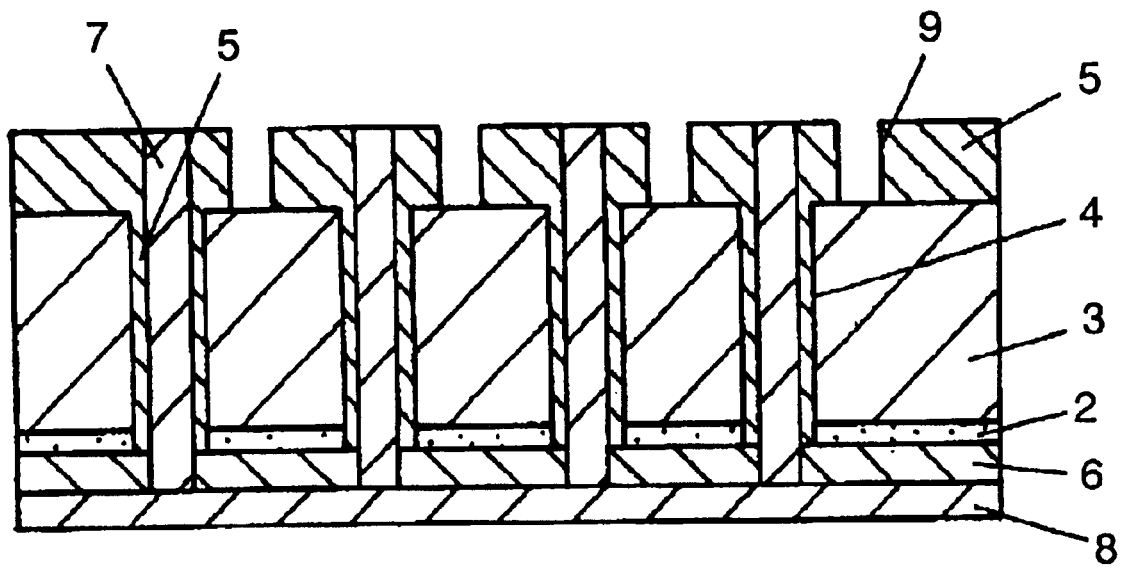
FIG. 9 is a cross sectional view of an SEC, showing a state after an opening was formed in the insulation layer in the first embodiment.
Figure 10:
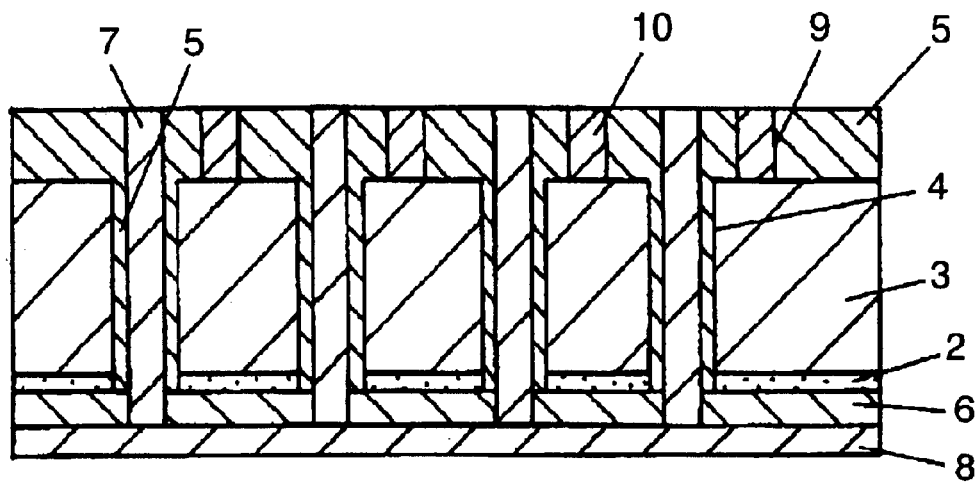
FIG. 10 is a cross sectional view of an SEC, showing a state after a connection terminal was formed in the opening in the first embodiment.
Figure 11:
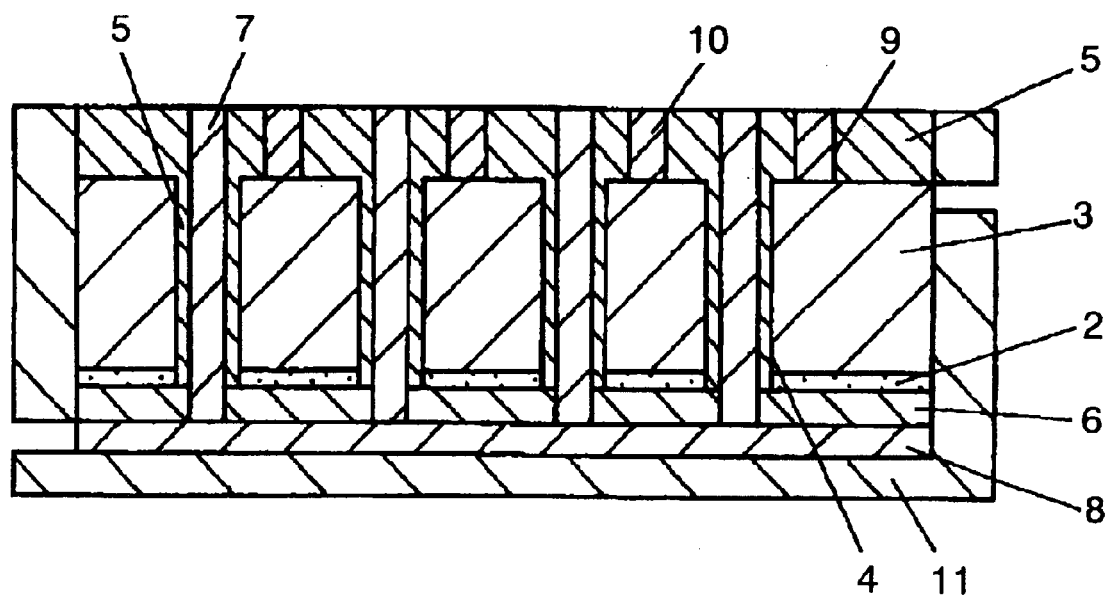
FIG. 11 is a cross sectional view of capacitor elements of an SEC, showing a state after a package was provided in the first embodiment.
Figure 12:
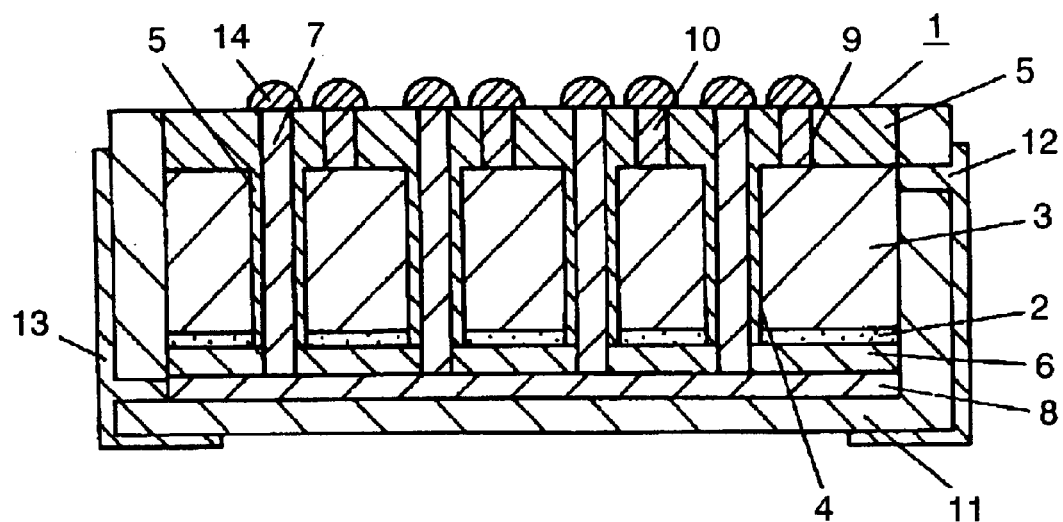
FIG. 12 is a cross sectional view of an SEC, showing a state after external terminals were provided on the package, as well as connection bumps, in the first embodiment.

Next, a process for forming a through hole electrode 7 in the through hole 4, as shown in FIG. 7, is described. The through hole is filled with a conducting adhesive substance such as Ag paste, Cu paste, etc. containing conductive particles, and then it is cured to form the through hole electrode 7. And then, a collector layer 8 is formed on the solid electrolytic layer 6, as shown in FIG. 8. The collector layer 8 is formed by using a suspension of carbon particles and a conducting adhesive material containing a silver past as the main ingredient, into a laminate structure of a carbon layer and a silver paste layer. The structure efficiently makes the electrical charges available. Then, as shown in FIG. 9, the insulation layer 5 formed on the other surface of aluminum foil 3 is provided with an opening 9 at a certain specific location, by means of YAG laser or other process such as grinding. Besides the above method, the opening 9 can be formed also by other process; namely, providing a resist portion on the aluminum foil 3 before formation of insulation layer 5 at a certain specific place on the non-porous surface, and forming a collector layer 8 and an insulation layer 5, and then removing the resist portion. Then, a connection terminal 10 is formed on the surface exposed through the opening 9 of insulation layer 5, as shown in FIG. 10, using a conductive adhesive substance, or by an electroplating or electroless plating. The capacitor element 1 is covered with an epoxy resin package 11, as shown in FIG. 11, for protecting it from humidity and stress from outside and ensuring good electrical insulation and increasing the reliability. The package 11 is provided with a first external terminal 12, which is electrically connected with the aluminum foil 3, and a second external terminal 13, which is electrically connected with the collector layer 8, to complete a finished capacitor element 1.

The component of above-described structure functions as it is as an SEC of the present invention. However, it is preferred to further provide connection bumps 14 on the connection terminal 10 and the through hole electrode 7, in order to raise the reliability in electrical connection with a semiconductor component or the like electronic component, and to improve the electrical performance.

The SECs manufactured in accordance with the above-described manufacturing process have the connection terminals 10 and the connection bumps 14 disposed respectively on a same plane. Thus the present invention offers a method for manufacturing SECs that can be connected direct with semiconductor components, and superior in the high frequency characteristic.

Embodiment 2

Figure 13:
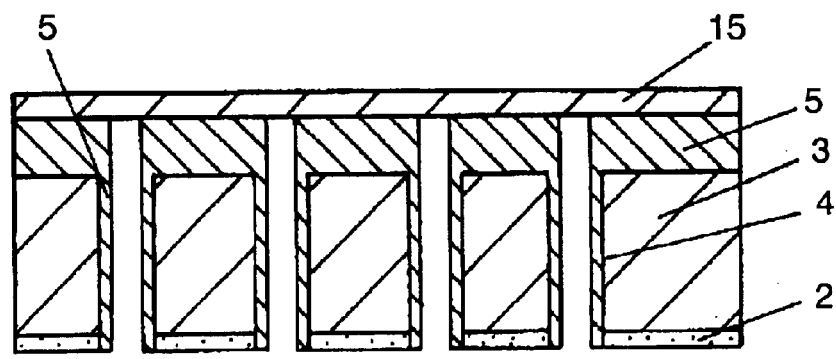
FIG. 13 is a cross sectional view of an SEC, showing a state after a resist film was provided on the insulation layer in a second exemplary embodiment.
Figure 14:
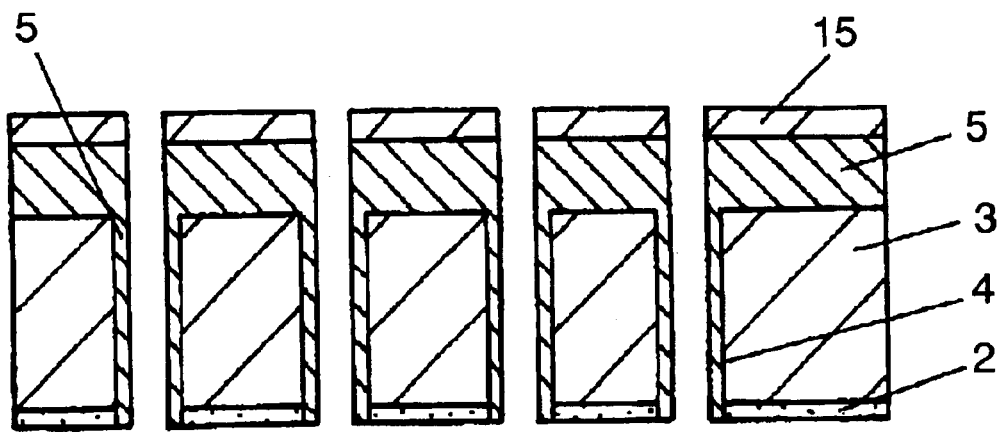
FIG. 14 is a cross sectional view of an SEC, showing a state of resist film after patterning in the second embodiment.

FIG. 13 and FIG. 14 are the drawings used to describe the main process steps of manufacturing an SEC in accordance with a second exemplary embodiment of the present invention.

One of the surfaces of an aluminum foil 3 is etched for making it porous, and a dielectric layer 2 is formed on the porous portion. And then, a through hole 4 is formed in the aluminum foil 3 at a certain specific location, and an insulation layer 5 is provided to cover the other surface, viz. non-porous surface, of aluminum foil 3 and the inner wall surface of through hole 4.

So far, the procedure remains the same as in the embodiment 1. Next, when providing a solid electrolytic layer 6 on the dielectric layer 2, if the through hole has a diameter 80 µm or larger the solid electrolytic layer 6 could form on the other surface, viz. non-porous surface, of aluminum foil 3.

In order to prevent this to happen, a photo sensitive resin is applied on the surface of insulation layer 5, as shown in FIG. 13, by using either of the methods among an immersion method, a spin coating process and a screen printing method. The photo sensitive resin is cured to form a resist film 15.

Instead, an adhesive organic film may be used for the resist film 15. In this case, a film is attached on the surface of insulation layer 5. And then, the film is provided with a hole of certain specific dimensions at a location corresponding to the through hole 4, as shown in FIG. 14, by means of a photo processing or a mechanical machining. The film is used as the resist film. A solid electrolytic layer 6 and a through hole electrode 7 are provided in the same way as in the embodiment 1, and then the resist film 15 is removed. Thus, no solid electrolytic layer 6 is formed on the other surface, viz. non-porous surface, of aluminum foil 3, and the positive electrode and the negative electrode are surely separated. Thereafter, in the same way as in the embodiment 1, a collector layer 8 is formed on the solid electrolytic layer 6, an opening 9 is formed in the insulation layer 5 disposed on the other surface of aluminum foil 3 at a certain specific location, and a connection terminal 10 is provided at the opening 9 of insulation layer 5 and on the exposed surface of through hole electrode 7, respectively. Thus in an SEC manufactured in accordance with the manufacturing method of the present embodiment 2, a possible spreading of the solid electrolytic layer onto the opening 9 of aluminum foil 3 is avoided, since the opening is formed at a later step, and the positive electrode and the negative electrode are certainly separated to each other.

Embodiment 3

Figure 15:
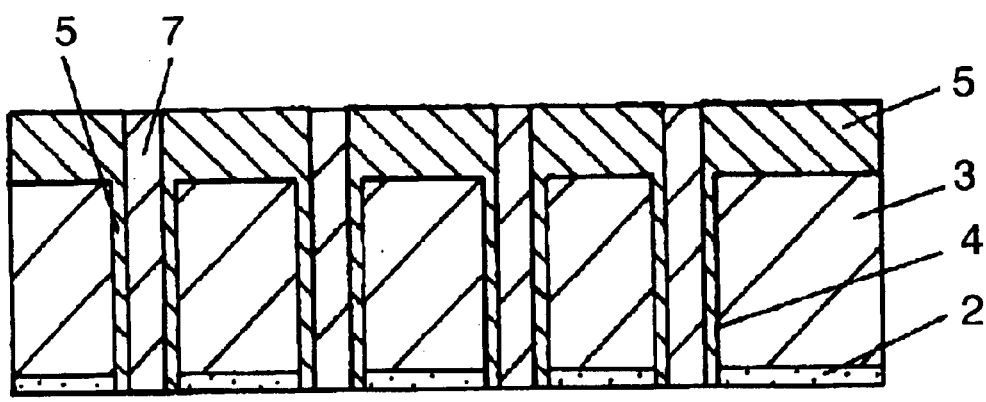
FIG. 15 is a cross sectional view of an SEC, showing a state after a through hole electrode was formed in the through hole in a third exemplary embodiment.
Figure 16:
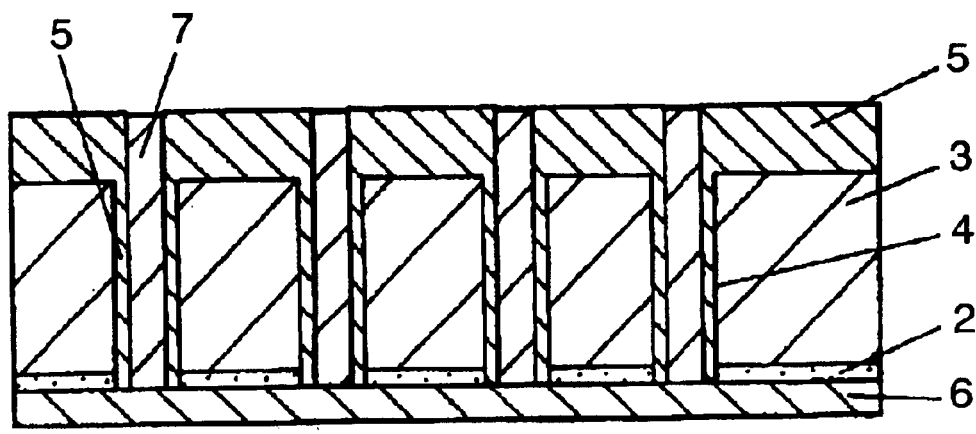
FIG. 16 is a cross sectional view of an SEC, showing a state after a solid electrolytic layer was formed on the dielectric layer in the third embodiment.

FIG. 15 and FIG. 16 are the drawings used to describe the main process steps of manufacturing an SEC in accordance with a third exemplary embodiment of the present invention.

One of the surfaces of an aluminum foil 3 is etched for making it porous, and a dielectric layer 2 is formed on the porous portion. And then, a through hole 4 is formed in aluminum foil 3 at a certain specific location, and an insulation layer 5 is provided to cover the other surface, viz. non-porous surface, of aluminum foil 3 and the inner wall surface of through hole 4.

So far, the procedure remains the same as in the embodiment 1. Next, when providing a solid electrolytic layer 6 on the dielectric layer 2, if the through hole has a diameter 80 µm or larger the solid electrolytic layer 6 could form on the other surface, viz. non-porous surface, of aluminum foil 3.

In order to prevent this to happen, a through hole electrode 7 is first formed in the through hole 4, as shown in FIG. 15.

The through hole electrode 7 is formed by filling a conductive adhesive substance such as Ag paste or Cu paste containing conductive particles, and curing it. And then, a solid electrolytic layer 6 is formed on the dielectric layer 2, as shown in FIG. 16. Therefore, no solid electrolytic layer 6 can be formed on the other surface, viz. non-porous surface, of aluminum foil 3. And then, a collector layer 8 is formed on the solid electrolytic layer 6 in the same way as in the embodiment 1, and an opening 9 is formed in the insulation layer 5 covering the surface of aluminum foil 3 at a certain specific location by means of YAG laser, or the like process. The opening 9 can be formed instead by providing a resist portion beforehand on the non-porous surface of aluminum foil 3 using photo sensitive resin or the like material prior to formation of the insulation layer 5, and removing the resist portion after collector layer 8 is formed. And then, connection terminal 10 is provided on the exposed surface at the opening 9 and on the through hole electrode 7, respectively. Thus in an SEC manufactured in accordance with the manufacturing method of the present embodiment 2, a possible spreading of the solid electrolytic layer onto the opening 9 of aluminum foil 3 is avoided, since the opening is formed at a later step, and the positive electrode and the negative electrode are certainly separated to each other.

Embodiment 4

Figure 17:
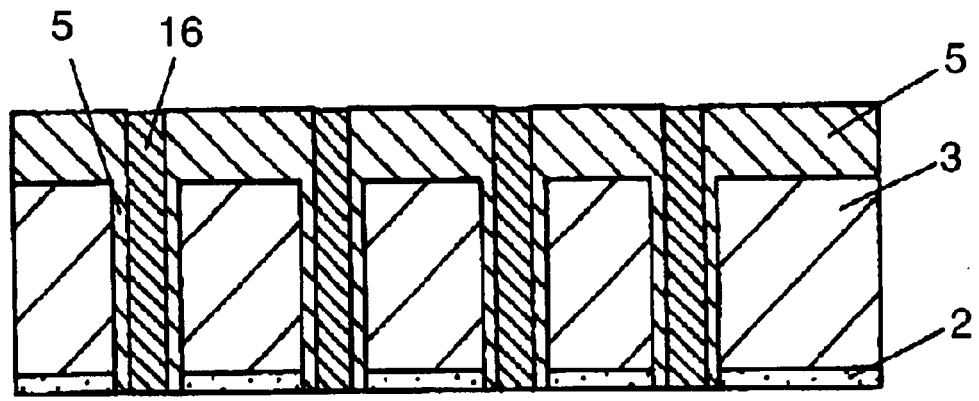
FIG. 17 is a cross sectional view of an SEC, showing a state after an insulation layer was formed on the non-porous surface of aluminum foil and an insulation portion was provided in the through hole in a fourth exemplary embodiment.
Figure 18:
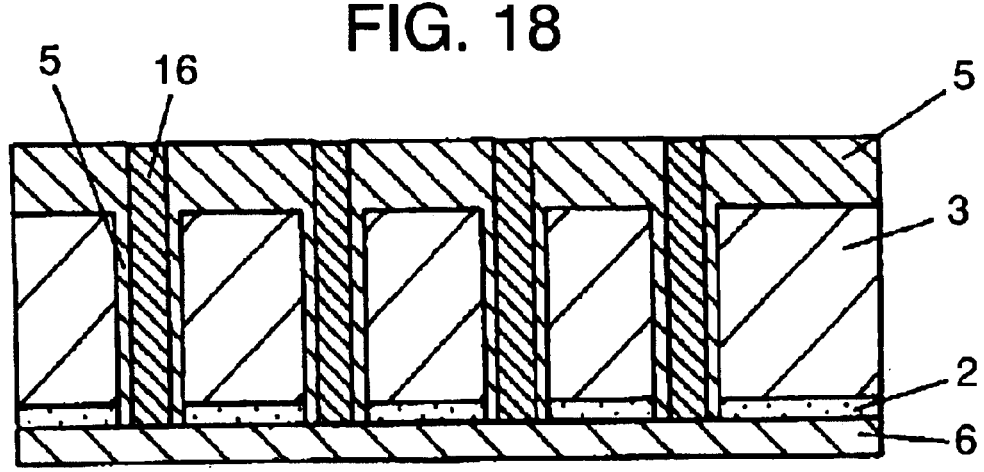
FIG. 18 is a cross sectional view of an SEC, showing a state after a solid electrolytic layer was formed on the dielectric layer in the fourth embodiment.

FIG. 17 and FIG. 18 are the drawings used to describe the main process steps of manufacturing an SEC in accordance with a fourth exemplary embodiment of the present invention.

One of the surfaces of an aluminum foil 3 is etched for making it porous, and a dielectric layer 2 is formed on the porous portion. And then, a first through hole 4 is formed in the aluminum foil 3 at a certain specific location. So far the procedure remains the same as in the embodiment 1. Next, an insulation layer 5 is formed to cover the other surface, viz. non-porous surface, of aluminum foil 3 and the inner wall surface of through hole 4. And then, a solid electrolytic layer 6 is provided on the dielectric layer 2. If the through hole has a diameter 80 µm or larger, the solid electrolytic layer 6 could form on the other surface, viz. non-porous surface, of aluminum foil 3.

Figure 19:
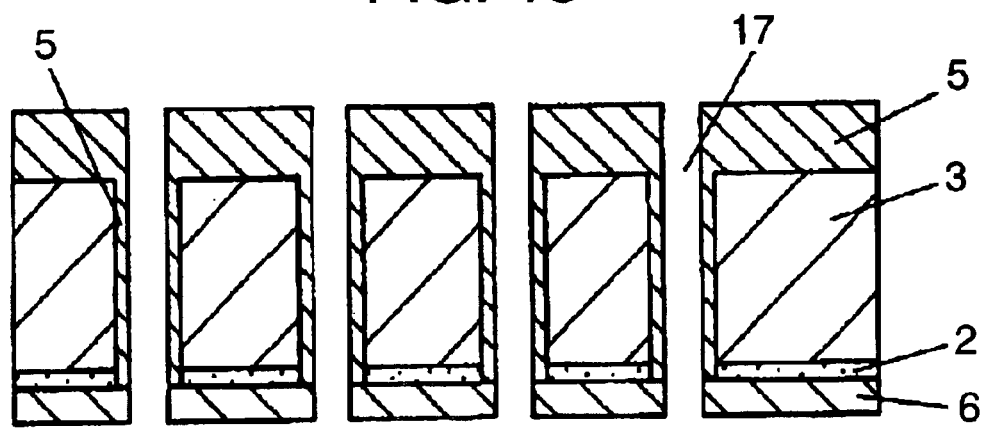
FIG. 19 is a cross sectional view of an SEC, showing a state after a through hole was formed in the insulation portion in the fourth embodiment.

In order to prevent this to happen, an insulation layer 5 is formed on the other surface, viz. non-porous surface, of aluminum foil 3, and an insulating portion 16 inside the first through hole, in the first place as shown in FIG. 17. The insulation layer 5 is formed in the same way as in the embodiment 1. The insulating portion 16 can be provided by electrodepositing an easy-to-fill insulating resin for several times to fill the through hole, or screen-printing or potting an insulating resin. And then, as shown in FIG. 18, a solid electrolytic layer 6 is formed on the dielectric layer. And, as shown in FIG. 19, a second through hole 17 is formed inside the insulating portion 16. When the above procedures are followed, no solid electrolytic layer 6 can be formed on the other surface, viz. non-porous surface, of aluminum foil 3.

And then, in the same way as in the embodiment 1, a through hole electrode 7 is formed in the second through hole 17, a collector layer 8 is formed on the solid electrolytic layer 6, and then the insulation layer 5 disposed on the aluminum foil 3 is provided with an opening 9 at a certain specific place, and a connection terminal 10 is provided at the opening 9 of insulation layer 5 and on the exposed surface of through hole electrode 7.

Thus in the method of manufacturing SEC in accordance with the present embodiment 4, the reliability in insulation between the through hole electrode 7 and the aluminum foil 3 is improved, and a possible spreading of solid electrolytic material onto the aluminum foil 3 at the opening 9 is prevented, to a sure separation between the positive electrode and the negative electrode.

INDUSTRIAL APPLICABILITY

In the method for manufacturing SECs in accordance with the present invention, the connection terminals provided at the opening of insulation layer and on the exposed surface of through hole electrode, respectively, are disposed on a single flat plane. Thus the present method of manufacture enables to manufacture with ease the large capacitance SECs that can be connected direct with semiconductor components and provide a superior high frequency characteristic.

What is claimed is:

1. A method for manufacturing a solid electrolytic capacitor comprising:
   providing an aluminum foil having first and second surfaces,
   forming a porous portion on the first surface of said aluminum foil,
   forming a dielectric layer on said porous portion,
   forming a through hole having an inner wall surface at a location in said aluminum foil,
   forming an insulation layer on said aluminum foil to cover both the second surface that is opposite the first surface and the inner wall surface of said through hole,
   forming a solid electrolytic layer on said dielectric layer,
   forming a through hole electrode having an exposed surface in said through hole,
   forming a collector layer on said solid electrolytic layer,
   forming an opening at a location in said insulation layer located on said aluminum foil, and
   locating a connection terminal at said opening and on the exposed surface of said through hole electrode.

2. The method for manufacturing a solid electrolytic capacitor recited in claim 1, wherein
   said through hole is formed by a process comprising application of a photo-resist on both of said first and second surfaces, and said photo-resist is wet-etched after being patterned.

3. The method for manufacturing a solid electrolytic capacitor recited in claim 1, wherein
   said through hole is formed by using a method selected from the group consisting of a laser beam machining, a punching method, a drilling method and an electric discharge machining.

4. The method for manufacturing a solid electrolytic capacitor recited in claim 1, wherein
   said dielectric layer is located on said porous portion after an edge of said through hole is chamfered.

5. The method for manufacturing a solid electrolytic capacitor recited in claim 1, wherein
   said insulation layer is formed by electrodeposition.

6. The method for manufacturing a solid electrolytic capacitor recited in claim 1, wherein
   said insulation layer comprises electrodeposition of a first layer of a first insulating resin and electrodeposition of a second layer of a second insulating resin formed by mixing a micro gel, carbon particles and titanium oxide particles.

7. A The method for manufacturing a solid electrolytic capacitor recited in claim 1, wherein
   said through hole electrode is formed by first filling said through hole with a conducting adhesive substance and then curing said adhesive substance.

8. The method for manufacturing a solid electrolytic capacitor recited in claim 1, wherein
   said opening is formed by using one of a laser beam machining method and a grinding method.

9. The method for manufacturing a solid electrolytic capacitor recited in claim 1, wherein
   said connection terminal is formed with a conducting adhesive substance.

10. The method for manufacturing a solid electrolytic capacitor recited in claim 1, wherein
    said connection terminal is formed by one of an electroplating and an electroless plating.

11. The method for manufacturing a solid electrolytic capacitor recited in claim 1, wherein
    said solid electrolytic layer is formed of a composite material comprising at least one among a π electron conjugated polymer and a conducting polymer other than said π electron conjugated polymer.

12. The method for manufacturing a solid electrolytic capacitor recited in claim 1, wherein
    said solid electrolyte is a conducting polymer formed by at least one of a chemical polymerization process and an electrolytic polymerization process.

13. The method for manufacturing a solid electrolytic capacitor recited in claim 1, wherein
    said solid electrolyte is a conducting polymer formed by applying a suspension of powdered conducting polymer on said dielectric layer, drying said applied polymer, and then electrolytically polymerizing said dried polymer.

14. The method for manufacturing a solid electrolytic capacitor recited in claim 1, wherein
    said solid electrolyte is manganese dioxide formed by heat-decomposing manganese nitrate.

15. The method for manufacturing a solid electrolytic capacitor recited in claim 1, wherein
    said solid electrolyte is a conducting polymer formed by electrolytic polymerization after manganese dioxide is obtained by heat-decomposition of manganese nitrate.

16. The method for manufacturing a solid electrolytic capacitor recited in claim 1, wherein
    said collector layer comprises a carbon particle suspension and a conducting adhesive substance.

17. A method for manufacturing a solid electrolytic capacitor comprising:
    providing an aluminum foil having first and second surfaces,
    forming a porous portion on the first surface of said aluminum foil,
    forming a dielectric layer on said porous portion,
    forming a through hole having an inner wall surface at first location in said aluminum foil,
    forming a resist portion at a second location on said aluminum foil,
    forming an insulation layer on said aluminum foil to cover both the second surface that is opposite the first surface and the inner wall surface of said through hole,
    forming a solid electrolytic layer on said dielectric layer,
    forming a through hole electrode having an exposed surface in said through hole,
    forming a collector layer on said solid electrolytic layer,
    forming an opening in said insulation layer at said second location in said aluminum foil by peeling said resist portion, and
    locating a connection terminal at said opening in said insulation layer and on the exposed surface of said through hole electrode.

18. A method for manufacturing a solid electrolytic capacitor comprising:
    providing an aluminum foil having first and second surfaces, forming a porous portion on the first surface of said aluminum foil, forming a dielectric layer on said porous portion, forming a through hole having an inner wall surface at a first location in said aluminum foil, forming an insulation layer on said aluminum foil to cover both the second surface that is opposite the first surface and the inner wall surface of said through hole, forming a resist film covering an entire surface of said insulation layer, forming a solid electrolytic layer on said dielectric layer, forming a through hole electrode having an exposed surface in said through hole, peeling said resist film, forming a collector layer on said solid electrolytic layer, forming an opening in said insulation layer at a second location in said aluminum foil, and locating a connection terminal at said opening in said insulation layer and on the exposed surface of said through hole electrode.

19. The method for manufacturing a solid electrolytic capacitor recited in claim 18, wherein said resist film comprises one of a photo sensitive resin and an adhesive organic film.

20. The method for manufacturing a solid electrolytic capacitor recited in claim 18, wherein said resist film is formed by using a method selected from the group consisting of an immersing method, a spin coating process, a screen printing method and a film attaching method.

21. A method for manufacturing a solid electrolytic capacitor comprising:

providing an aluminum foil having first and second surfaces, forming a porous portion on the first surface of the surfaces of said aluminum foil, forming a dielectric layer on said porous portion, forming a through hole having an inner wall surface at a first location in said aluminum foil, forming a resist portion at a second location on said aluminum foil, forming an insulation layer on said aluminum foil to cover both the second surface that is opposite the first surface and the inner wall surface of said through hole, forming a resist film covering an entire surface of said insulation layer, forming a solid electrolytic layer on said dielectric layer, forming a through hole electrode having an exposed surface in said through hole, peeling said resist film, forming a collector layer on said solid electrolytic layer, forming an opening in said insulation layer at a second location in said aluminum foil by peeling said resist portion, and locating a connection terminal at said opening in said insulation layer and on the exposed surface of said through hole electrode.

22. A method for manufacturing a solid electrolytic capacitor comprising:

providing an aluminum foil having first and second surfaces, forming a porous portion on a first surface of the surfaces of said aluminum foil, forming a dielectric layer on said porous portion, forming a through hole having an inner wall surface at a first location in said aluminum foil, forming an insulation layer on said aluminum foil to cover both the second surface that is opposite the first surface and the inner wall surface of said through hole, forming a through hole electrode having an exposed surface in said through hole, forming a solid electrolytic layer on said dielectric layer, forming a collector layer on said solid electrolytic layer, forming an opening in said insulation layer at a second location in said aluminum foil, and locating a connection terminal at said opening in said insulation layer and on the exposed surface of said through hole electrode.

23. The method for manufacturing a solid electrolytic capacitor recited in claim 22, wherein said opening is formed by locating a resist portion on a non-porous surface of said aluminum foil prior to formation of said insulation layer, and then peeling said resist portion after said collector layer is formed.

24. A method for manufacturing a solid electrolytic capacitor comprising:

providing an aluminum foil having first and second surfaces, forming a porous portion on a first surface of the surfaces of said aluminum foil, forming a dielectric layer on said porous portion, forming a first through hole having an inner wall surface at a first location in said aluminum foil, forming an insulation portion on said aluminum foil to cover the second surface that is opposite the first surface and the inside of said first through hole, forming a solid electrolytic layer on said dielectric layer, forming a second through hole in said insulation portion, forming a through hole electrode having an exposed surface in said second through hole, forming a collector layer on said solid electrolytic layer, forming an opening at a second location in said insulation portion located on said aluminum foil, and locating a connection terminal at said opening in said insulation layer and on the exposed surface of said through hole electrode.

* * * * *